(12) United States Patent
Nakaya et al.

(10) Patent No.: US 11,503,849 B2
(45) Date of Patent: Nov. 22, 2022

(54) SOY SAUCE PRODUCTION EQUIPMENT AND PROCESS

(71) Applicant: SAKURA NAKAYA ALIMENTOS LTDA, São Paulo (BR)

(72) Inventors: Renato Kenji Nakaya, São Paulo (BR); Renato Akira Honma, São Paulo (BR); Rafael Jun Tomita, São Paulo (BR)

(73) Assignee: SAKURA NAKAYA ALIMENTOS LTDA, Sao Paulo (BR)

( * ) Notice: Subject to any disclaimer, the term of this patent is extended or adjusted under 35 U.S.C. 154(b) by 410 days.

(21) Appl. No.: 16/126,336

(22) Filed: Sep. 10, 2018

(65) Prior Publication Data

US 2020/0077688 A1  Mar. 12, 2020

(51) Int. Cl.
*A23L 27/50* (2016.01)
*A23P 30/25* (2016.01)
(Continued)

(52) U.S. Cl.
CPC ............ *A23L 27/50* (2016.08); *A23L 7/104* (2016.08); *A23L 11/50* (2021.01); *A23P 30/25* (2016.08); *A23V 2002/00* (2013.01)

(58) Field of Classification Search
None
See application file for complete search history.

(56) References Cited

U.S. PATENT DOCUMENTS 5,665,407 A * 9/1997 Nagata .................... A23L 11/50
426/18

5,939,571 A * 8/1999 Foidl ....................... C11C 3/003
554/12

(Continued)

FOREIGN PATENT DOCUMENTS

BR         9608146-5       2/1999
BR         0007400         11/2000
(Continued)

OTHER PUBLICATIONS

Luh, B.S. "Industrial Production of Soy Sauce." Journal of Industrial Microbiology (1995) 14, 467-471 (Year: 1995).*

(Continued)

*Primary Examiner* — Viren A Thakur
(74) *Attorney, Agent, or Firm* — Porzio Bromberg & Newman P.C.

(57) ABSTRACT

This abstract refers to an invention patent, for soy sauce production equipment and process, belonging to the field of the food product production media, such equipment comprised of: first set (100) comprised of: device (1), (2) to feed soybean and corn grains in their natural conditions and blended; cold-press extruder (3), receiving the soybean and corn grain blend in their natural conditions and obtaining homogeneous soy-corn agglomerate (5); size adjustment unit (6), adjusting the homogeneous soy-corn agglomerate 5 size and/or particle size; moisture adjustment unit (7); microorganism inoculation unit (8); and automated stove (9) responsible for the first fermentation for 40.00 to 72.00 hours of the crushed soy-corn mass, with adjusted moisture and inoculated with microorganism, after such fermentation the basic ingredient (koji) is obtained, which is then transferred to the second set (200), with usual construction, which processes the koji until finally obtaining the soy sauce.

1 Claim, 6 Drawing Sheets

Figure 1:
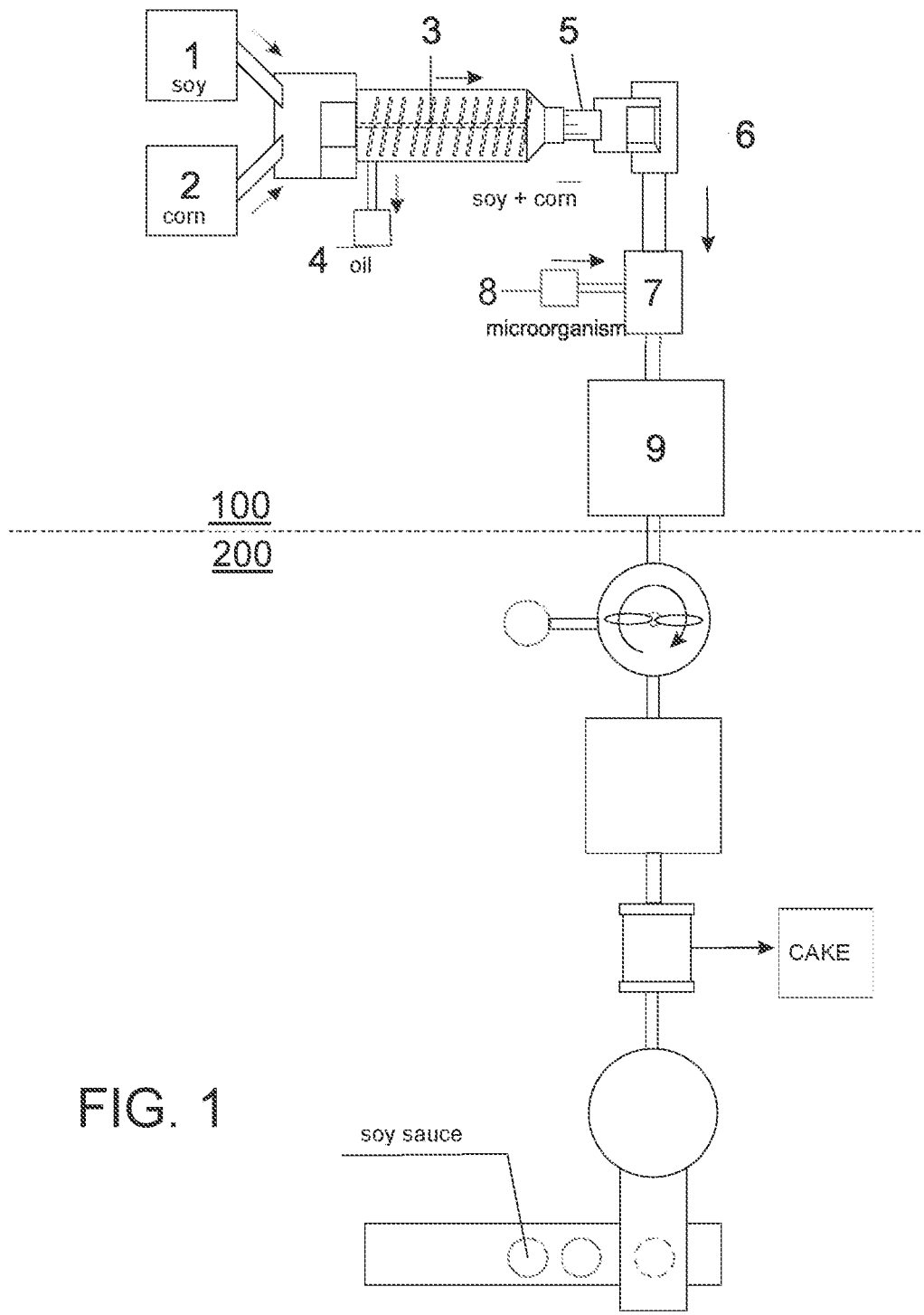

(51) Int. Cl.
    *A23L 7/104*         (2016.01)
    *A23L 11/50*        (2021.01)

(56) References Cited

U.S. PATENT DOCUMENTS

| | | | | |
|---|---|---|---|---|
| 6,634,508 | B1* | 10/2003 | Ishigaki | B01D 33/72 |
| | | | | 210/414 |
| 7,398,886 | B2* | 7/2008 | Widmer | B30B 9/121 |
| | | | | 210/415 |
| 2009/0078128 | A1* | 3/2009 | Galvao | B30B 9/121 |
| | | | | 99/485 |
| 2009/0098246 | A1* | 4/2009 | Hanada | A23L 27/50 |
| | | | | 426/46 |
| 2018/0030372 | A1* | 2/2018 | Maki | C07C 31/08 |

FOREIGN PATENT DOCUMENTS

| | | |
|---|---|---|
| BR | 0212302-9 A2 | 10/2004 |
| CN | 107712812 A * | 2/2018 |
| JP | 01104141 A * | 4/1989 |
| MU | 8402851-3 Y1 | 4/2009 |

OTHER PUBLICATIONS

Wilson, L.A.. "Soy Foods" Practical Handbook of Soybean Processing and Utilization. Chapter 22, pp. 451-452 1995 (Year: 1995).*

* cited by examiner

PRIOR ART
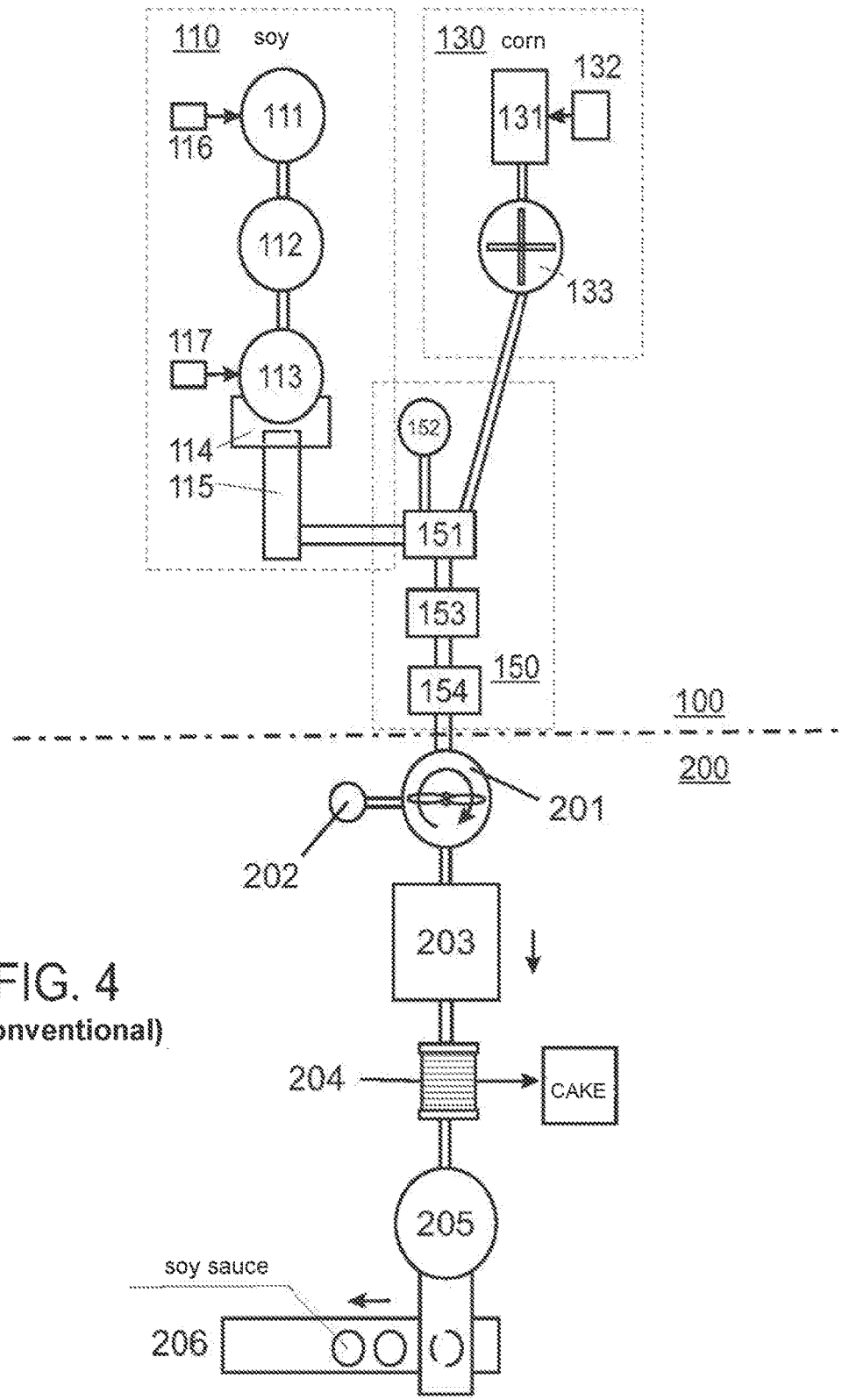
FIG. 4
(Conventional)

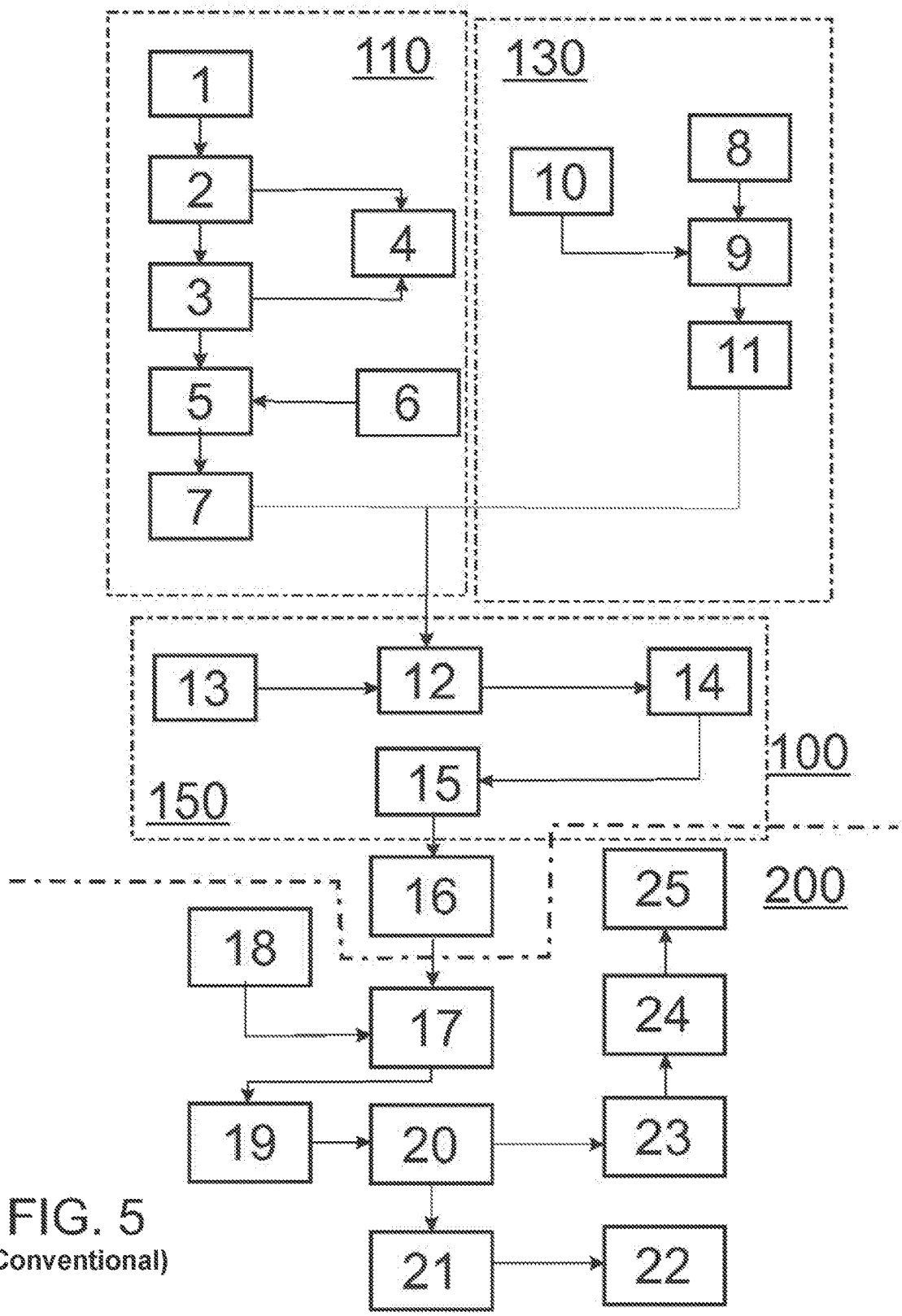
FIG. 5
(Conventional)

PRIOR ART
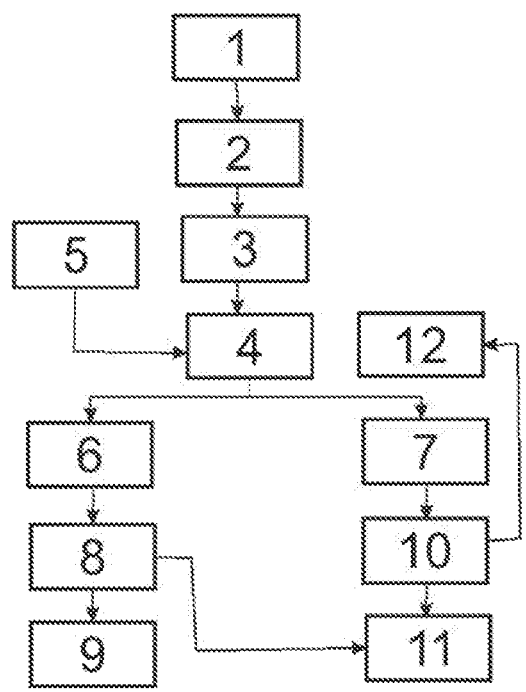
FIG. 6
(Conventional)

SOY SAUCE PRODUCTION EQUIPMENT AND PROCESS

INTRODUCTION

These detailed specifications refer to an invention patent, for soy sauce production equipment and process, belonging to the industry of the food product manufacturing means, which have been improved to be finally streamlined and have reduced costs in relation to similar usual equipment and process, providing efficient, technically streamlined production, with reduced costs, as compared to conventional production, by prioritizing any savings of natural resources, such as water and fossil fuel, following the ideas of green, more ecologically fair processes, as well as aimed at obtaining a higher-quality final product. Any such advantages shall be discussed in further details in the following report.

STATE OF THE ART

Soy sauce is a highly traditional food product. Production thereof occurs using an ancestral process and significantly consists in two primary stages:

A first solid-state fermentation stage (koji), when growth of the microorganism, *Aspergillus oryzae* or *sojae*, occurs on the substrate containing the wheat and soya blend, producing different enzymes, such as proteases, amylases, cellulases and glutaminases. Produced enzymes hydrolyze macromolecules such as raw material proteins and polysaccharides.

A second fermentation stage (moromi) is made when, at the first stage, the fungus growth reaches its desired level and a heterogeneous wheat and soya blend is formed covered by the mycelia. At such second stage, such formed blend is added to a sodium chloride solution at 18-23%, providing the first step for the development process of halophilic and/or halotolerant lactic bacteria. Such growth causes decreased pH due to lactic acid production. Decreased pH enables yeast growth thus producing alcohol. Following full fermentation occurring at the second stage, the sauce is filtered, pasteurized and distributed for sale.

Currently, for industrial-scale production, the soy sauce production process involves many stages and complex equipment.

The block diagram of FIG. 5 refers to the conventional production process, being comprised of the following: First set of 100 fermentation stages obtaining the primary ingredient (koji); and Second set of 200 fermentation stages (moromi) processing the koji and that, therefrom results into the soy sauce.

The set of 100 fermentation stages, firstly, processes soy and corn separately, through: Set of 110 soy processing stages and Set of 130 corn or any other cereal processing stages; such set of 110 soy processing stages comprises the following stages:

1—Forecast of soybean grain or soy or defatted soy;
2—Soy washing;
3—Soy moistening conducted for a time of 10.00 to 11.00 hours, which stages 2 and 3 forecasts the supporting stage of 4) water feeding;
5—Soy decoction, which stage forecasts the supporting stage of 6) production and steam supply;
7—Cooling.

The set of 130 corn or any other cereal processing stages foresees the following stages:

8—Estimates of corn or any other cereal;
9—Roasting of corn or any other cereal, including the supporting stage of 10) natural gas feed and burning; and
11—Roasted corn or any other cereal grinding process.

From this time, there is the set of stages for corn soya blend processing 150 comprised of the following stages:

12—Heterogeneous blend of the decocted soy and roasted and crushed corn or any other cereal;
13—Introduction of the microorganism *Aspergillus oryzae* or *sojae* to the blend;
14—Moisture adjustment;
15—First blend fermentation stage for 40.00 to 72.00 hours, in which the primary ingredient (koji) 16 is obtained, which is transferred to the Second set of fermentation stages (moromi) 200.

The second set of fermentation stages (moromi) 200, comprises the following stages:

17—Primary ingredient (koji) and brine blend, which has a supporting stage of 18)—brine production and feed at 18-23%;
19—Fermentation for 4 to 6 months;
20—Pressing, where there is production of two products: 21) byproduct (cake/kassu) used as 22) animal food; and 23) the raw soy sauce product;
24—Pasteurizing of the raw soy sauce; and
25—Bottling.

Such process is conducted in a relatively large, complex equipment (FIG. 4), mainly comprised of: First set of equipment 100 (koji) comprised of: Subset of soy processing 110; Subset of corn or any other cereal processing 130 processing soy and corn separately; and Subset of corn soya blend processing 150; such equipment also comprised of a Second set of equipment 200 (moromi).

The Subset of soy processing 110 is mainly comprised of: high-capacity grain washing unit 111; soy moistening tanks 112; high-capacity autoclave for soy decoction 113 associated with decocted soy conveyor equipment (release) 114; chiller 115 receiving the soy from the release; such washing unit 111 and autoclave 113 associated with water 116 and steam 117 feed circuits, respectively.

The second subset 130 for corn or any other cereal processing is mainly comprised of: a high-capacity roaster 131 associated with the gas feed unit 132; and by mill 133.

Subset 150 processing the decocted soy and decocted and crushed corn or any other cereal blend is comprised of: mixer 151; *Aspergillus oryzae* or *sojae* microorganism inoculation unit 152; moisture adjustment unit 153 and automated stove 154 conducting the first fermentation for 48.00 to 72.00 hours until obtaining the first primary ingredient (koji), which, following the first fermentation is transferred to the Second set of equipment 200.

The Second set of equipment 200 is significantly comprised of: koji crusher 201 associated with the brine production and feed equipment at 18-23.0% 202; fermentation unit containing mixer 203 responsible for the second fermentation for 4 to 6 months; set of press filter 204; pasteurizer 205; and bottling equipment 206.

All such components are logically associated with the electric power, steam, water supply systems, incorporate drive systems such as electric engines, security systems such as valves, switches; electric-electronic supervisory, controlling and regulation systems lodged with board(s) equipped with operator interface components, such as displays, keyboards, lamps and sound alarm devices and others; light systems and others.

The number of processing stages and the conventional equipment that carries them out results, as a consequence, into a relatively complex, highly expensive manufacturing process, which expenses are reflected to the final product cost.

The equipment, given its size and complexity, involves high operating and maintenance costs.

On the other hand, the conventional equipment requires a large installation area, which also increases the costs with the manufacturing process and the manufactured product.

All that ends up by resulting into relatively higher costs for the final product. However, some industries are interested in rendering the soy sauce increasingly affordable to a broad range of the population.

Accordingly, such state-of-the-art inconveniences have been desirable to be solved.

Add to all that, when the soy sauce production process is obtained from defatted soy, the soy is submitted prior to the soy sauce production process, as described previously, to a soy degreasing process. FIG. 6 flowchart refers to the soy degreasing process, which is significantly comprised of the following stages:

1—Estimates of grain soybeans;
2—Soy peeling;
3—Soy rolling;
4—Solvent extraction requiring the supporting stage of 5) solvent feed;

Out of stage 4)—Solvent extraction, two products are obtained: 6) Defatted soy (with solvent); and 7)—Miscella (oil+solvent);

6) Defatted soy (with solvent) is submitted to the stage 8) Toasting whereby two products are obtained: 9) Defatted soy and 11) Solvent.

7) Miscella (oil+solvent) is equally submitted to 10)—Toasting, resulting two products: 12) crude oil and 11)—Solvent.

This process obviously requires specific equipment for accomplishment thereof which aggravate the above-detailed conventional soy production process.

INVENTION AIMS

Thus, this patent is aimed at providing a soy sauce production equipment and process able to overcome the problems, as mentioned above, noticed with their conventional peers.

A further aim is providing efficient construction equipment and production process which is more streamlined than the conventional.

A further aim is providing smaller equipment that could be installed in areas correspondingly smaller than usual.

A further aim is providing equipment with reduced acquisition, operation and maintenance costs than usual.

A further aim is providing a production system closely related to green industrial process concepts, wherein there is reduced use of natural resources such as water and reduced use of non-renewable fossil fuel.

A further aim is obtaining, by the end of the inventive process, a higher quality product, following specialized institutions-preset parameters.

BRIEF INVENTION DESCRIPTION taking into account the inconveniences, as mentioned previously, noticed in the usual soy sauce production equipment and processes and for the purpose of overcoming these problems, focused on meeting the aims listed above, the improvements to soy sauce production equipment and process, under this patent, have been developed, having as their primary characteristic the fact that the soy (or any other protein source grain) and corn (or any others starch source cereal), instead of being processed initially separately and, then, mixed for the first fermentation until the primary ingredient (koji) is obtained, as per the stages/subsets 110, 130, 150 above listed of the conventional equipment and process, they are simultaneously processed; such soy and corn, as examples of protein and carbohydrate sources, respectively, in this equipment and process, are taken in their original constitutions, (whole grains) mixed and processed together in a cold-extruder press, where two products can be noticed to be originated: the process interest product comprised of homogeneous soy-corn (or any other cereal) agglomerate (blend) with unique characteristics, and a byproduct comprised of oil from the processed grains, whose disposal is widely variable depending on the processing conditions; such homogeneous soy-corn (or any other cereal) blend is then: submitted to size, particle size adjustments; submitted to moisture adjustment; added with the microorganism *Aspergillus oryzae* or *sojae* and submitted to its first fermentation until the primary ingredient, koji, is obtained; which is then submitted to the further conventional stages until the soy sauce is obtained, as previously described, in the conventional process (FIG. 5 flowchart) and equipment (FIG. 4) descriptions Such an equipment construction and process method overcome the problems and inconveniences noticed in the state of the art mentioned above, thus meeting the primary aim of the invention. In fact, the equipment and process herein are simpler than the conventional equipment and process. This equipment is smaller and simpler than the conventional one, since operation of the extruder press over the soy-corn blend, or any other cereal, in addition to providing homogeneous blend of such ingredients, concurrently offers attrition and, as a result, heat on them at levels that do not require the usual moisturizing stages, removing the required use of water for it, soy decoction (because the press-extrusion process denatures proteins in a highly efficient manner) and corn roasting stage (since, in this process, starch is properly gelatinized), as well as do not require equipment responsible for such stages and all systems associated with such equipment, such as steam supply, gas supply and burning and others.

Smaller equipment requires reduced investment, decreased operation and maintenance costs, as well as requires smaller areas and the resulting reduced installation cost, all that resulting into lower costs which beneficially reflect on the final product cost depending on other invention aims.

A further benefit of this process and equipment is not requiring the procedural stages and specific equipment for soy degreasing, since the soy, jointly with corn or any other cereal, in this process, are used in their original conditions, not requiring any chemical solvents to be used which are detrimental to human health and the environment.

ILLUSTRATIVE INVENTION DRAWINGS

The attached drawings refer to the improvements to soy sauce production equipment and process, under this patent, whereby:

FIG. 1 displays a layout for the first subset responsible for the first fermentation, built according to this invention, from which the primary ingredient (koji) is obtained, and operating jointly with the second usual subset which receives the basic ingredient and conducts the second fermentation (moromi) until the soy sauce is obtained; such first and second subsets composing the soy sauce production equipment.

Figure 2:
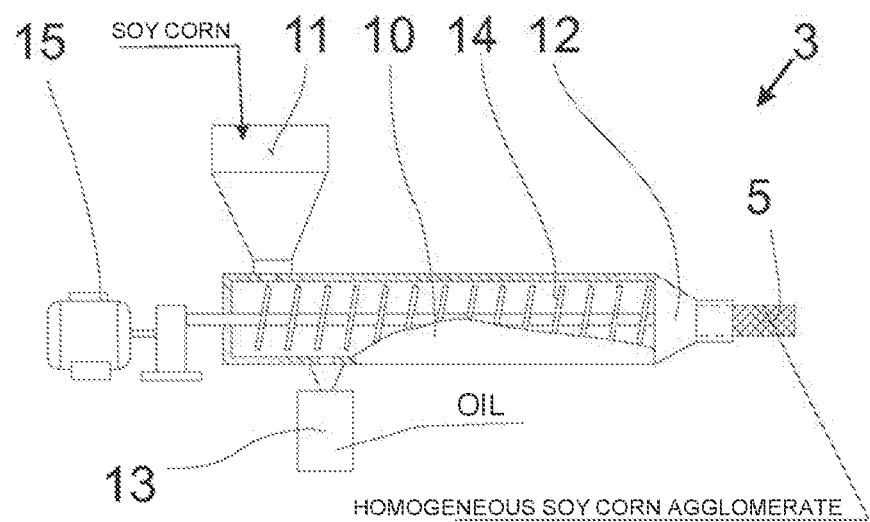
Figure 3:
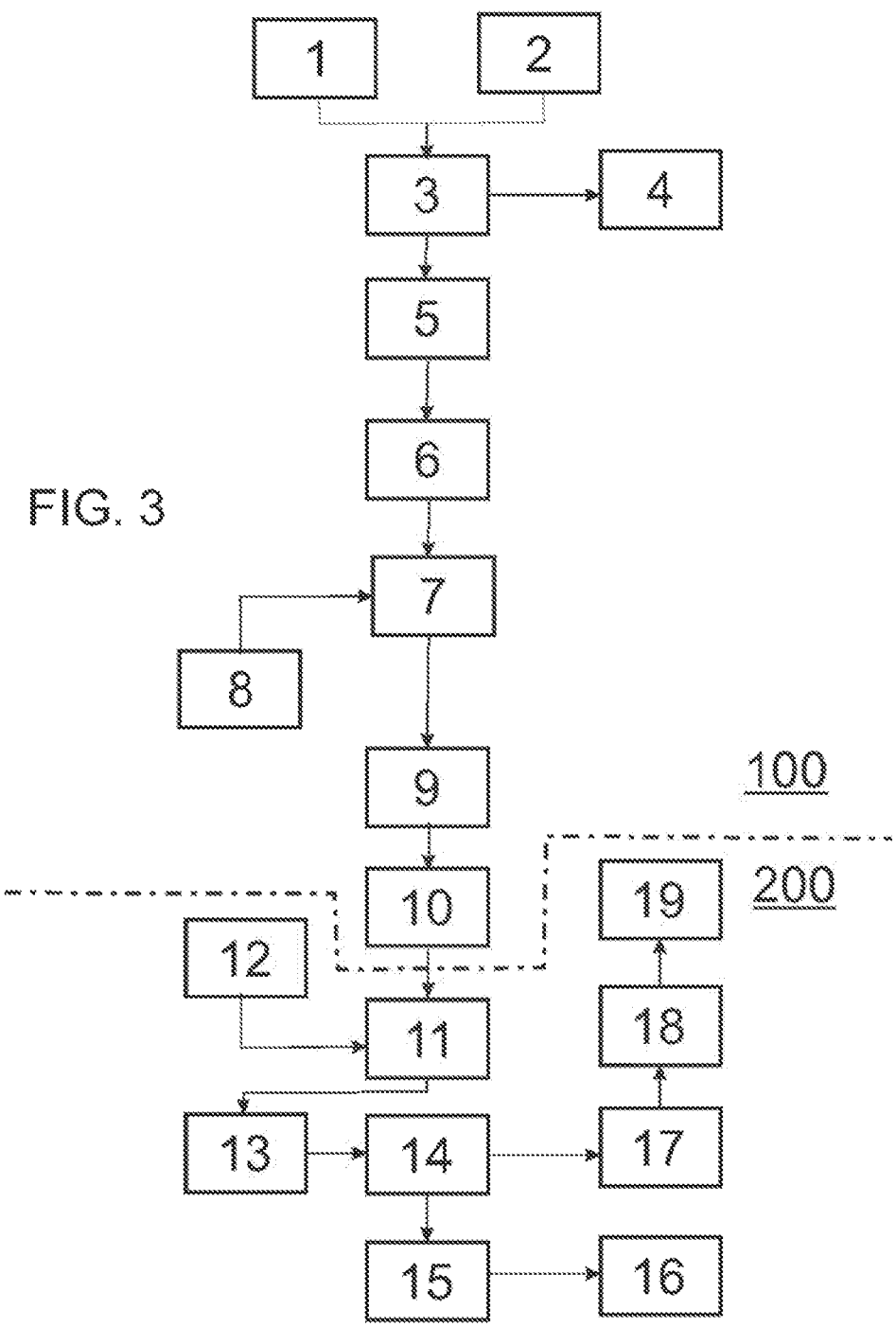

FIG. 2 displays a schematic view of a cold-press extruder-type press model used in the first subset responsible for the first fermentation, (koji), as mentioned above;

FIG. 3 displays a soy sauce production process flowchart about this invention;

FIG. 4 displays a general layout for the equipment conducting the conventional process;

FIG. 5 displays a conventional soy sauce production process flowchart;

FIG. 6 displays a soy degreasing process flowchart, which could comprise the conventional sauce and soy production processes.

DETAILED DESCRIPTION BASED ON FIGURES

As depicted by the aforementioned figures, the equipment and process, object of the present patent, are intended to soy sauce production; such equipment comprised, usually and significantly (FIG. 4) of: First set of equipment 100 (koji) receiving soy and corn or any other cereal, hot-processing them, mixing them, inoculating microorganisms and conducting the first fermentation until the primary ingredient is obtained (koji); and Second set of equipment 200 (moromi) receiving the koji, adding brine, conducting the second fermentation, pressing and obtaining two products: a byproduct, cake, useful as animal food; and the process interest product comprised of raw soy sauce; such second set 200 still conducts pasteurizing of the raw sauce and bottling.

In this improvement, and since it is the primary goal to be protected in this patent, instead of the first set 100 (FIG. 1) of equipment being comprised of the subset of soy processing 110 (FIG. 4) and subset of corn or any other cereal processing 130 (FIG. 4) following the conventional equipment construction; such first set 100, in this invention (FIG. 1) is essentially comprised of: device 1 for soybean grain feed (or any other protein source grains) in their natural condition and device 2 for corn (or any other starch source cereal) grain feed in their natural condition which form a grain blend in their natural conditions; cold-press extruder 3 primary inclusion into the equipment under the invention which receives the grain blend in their natural conditions, processes them resulting into two products being obtained: oil byproduct (e.g.: soy+corn) 4 whose destination and use could differ for the pharmaceutical, food segments, and in the new-generation fuel generation (biodiesel), such that the oil destination to other industry sectors results into a soy sauce production system virtually waste-free; and product of interest to the soy sauce production process comprised of a homogeneous soy and corn agglomerate (blend) 5 with desired molecular characteristics, such as protein denaturing and starch gelatinization; physical, such as porosity of the obtained agglomerate, enabling enhanced development of the filamentous fungus at the koji stage, and nutritional, since thermal treatment results into reduced antinutritional factors present in the crude soy, such as the trypsin inhibitors.

Such first set 100 of equipment, under the invention, is still comprised (FIG. 1) of: size adjustment unit 6 adjusting the size and/or particle size of the homogeneous soy-corn agglomerate 5; moisture adjustment unit 7, adjusting the moisture in the soy-corn agglomerate 5 with adjusted size and/or particle size obtained; microorganism inoculation unit 8 adding the microorganism *Aspergillus oryzae* or *sojae* to the raw material with adjusted moisture; and automated stove 9 responsible for the first fermentation for 40.00 to 72.00 hours of the soy and corn mass, with size and moisture adjusted and inoculated with microorganism, by the end of such fermentation the primary ingredient, koji, is obtained and then transferred to the second set of equipment 200 (moromi), with usual construction, processing the koji until finally obtaining the soy sauce (description of the second set of equipment 200 above referring to FIG. 4).

In details, the cold-press extruder 3 is a type essentially comprised of (FIG. 2): extended compartment 10 one edge of which features natural condition soy and corn feed hopper 11 and its opposite, homogeneous soy-corn agglomerate 5 outlet nozzle 12; oil (soy+corn) outflow drain 13 derived from the compartment 10; such cold-press extruder 3 also comprised of an appropriate layout of inner helicoidal 14 to the extended compartment 10 and moved by drive set 15; such compartment 10 and the helicoidal screw 14 laid-out, both constructively and functionally, to provide, along the soy and corn or any other cereal progress: 1) compression for oil extraction and breaking of the soybean and corn grains; 2) attrition-activated heating to result into denaturing of the soy proteins and corn gelatinization; 3) soy and corn blending and homogenization; 4) soy and corn adding to form the homogeneous soy-corn agglomerate 5 dispensed to the nozzle 12.

Presses like these may be seen, for example, in Patent MU 8402851-3; in documents: PI 0007400-4; PI 0212302-9; PI 9608146-5. The cold-press extruder 3 of this invention is a layout based on such systems and suitable to meet the peculiarities of soy sauce production processes.

The above-named equipment conducts an improved soy sauce production process comprised of: First 100 (koji) and Second 200 (moromi) fermentation stages (FIG. 3).

The first fermentation stage 100, which instead of having the soy and corn initially processed separately, the soy passing through: washing; moistening, decoction, cooling and the corn, roasting and crushing, following conventional processes (FIG. 5); such first fermentation stage 100, in this invention (FIG. 3), comprises the following stages:

1, 2 feeding and blending of soybean and corn or any other cereal grains in their natural conditions (whole grains, free from degreasing process using other methods, such as: chemical solvent extraction);

3—Processing in cold-press extruder of the soy-corn blend, obtaining two products: 4) oil byproduct with high usage potential; 5) homogeneous soy and corn agglomerate (blend);

6—Homogeneous soy-corn agglomerate 5 size and/or particle size adjustment;

7—Homogeneous soy-corn agglomerate (5) moisture adjustment with adjusted size and/or particle size obtained;

8—Inoculation of microorganism *Aspergillus oryzae* or *sojae* to the soy and corn mass with adjusted size and moisture;

9—First fermentation for 40.00 to 72.00 hours, after which 10) the primary ingredient koji is obtained which is fed to the second conventional fermentation stage 200 (moromi), (as described above based on FIG. 5).

Stage 3)—Pressing in cold-press extruder conducts the following processing stages at the natural soybean and corn grain blend: compression for oil extraction and breaking of soybean and corn grains; attrition-enabled heating for soy decoction and corn roasting; soy and corn blending and homogenization; soy and corn aggregation to form the homogeneous soy-corn agglomerate.

The compressive and heating strengths are selected for extracting the oil out of soy and corn; soy decoction; corn roasting, depending on the raw material conditions.

Within the aforementioned basic construction, we hereby apply for the equipment and process, under this patent, to receive changes related to constructive properties, sizing, material, functional and ornamental settings, stages and process parameters not leaving their focus on the applied protection scope.

The invention claimed is:

1. A soy sauce production process comprising a first stage of fermentation that produces koji, and a second stage of fermentation, the second stage of fermentation comprising the following steps:
blending the koji with brine at 18-23.00% that produces moromi;
fermenting the moromi for 4 to 6 months;
pressing of the fermented moromi to obtain cake byproduct and raw soy sauce;
pasteurizing of the raw soy sauce; and bottling of the raw soy sauce, wherein the first fermentation stage comprises the following steps:
a.) forming a natural soybean and corn grain blend from soybean in a natural condition and corn grain in natural condition, or forming a natural soybean and cereal grain blend from soybean in a natural condition and a cereal grain other than corn grain in a natural condition, wherein the soybean, the corn grain and the cereal grain in the natural condition are whole soybean, whole corn grain and whole cereal grain, respectively, and are not degreased;
b.) introducing the natural soybean and corn grain blend or the natural soybean and cereal grain blend into a cold-press extruder to:
compress the natural soybean and corn grain blend or the natural soybean and cereal grain blend to break and extract oil from the natural soybean and corn grain blend or the natural soybean and cereal grain blend;
heat the natural soybean and corn grain blend or the natural soybean and cereal grain blend to denature soy proteins of the soybean and gelatinize the corn grain or the cereal grain; and
mix and homogenize the natural soybean and corn grain blend or the natural soybean and cereal grain blend; and aggregate the natural soybean and corn grain blend or the natural soybean and cereal grain blend to obtain an oil byproduct and a homogeneous soybean and corn grain blend agglomerate using the natural soybean and corn grain blend, or to obtain an oil byproduct and a homogeneous soybean and cereal grain blend agglomerate using the natural soybean and cereal grain blend;
c.) adjusting a particle size of the homogeneous soybean and corn grain blend agglomerate or the homogeneous soybean and cereal grain blend agglomerate;
d.) adjusting a moisture of the homogeneous soybean and corn grain blend agglomerate of step c.) or the homogeneous soybean and cereal grain blend agglomerate from step c.);
e.) adding microorganism *Aspergillus oryzae* or *sojae* to the soybean and corn grain blend agglomerate of step d.) having the adjusted moisture or to the soybean and cereal grain blend agglomerate of step d.) having the adjusted moisture; and
f.) fermenting in the first stage of fermentation of the soybean and corn grain blend agglomerate of step e.) for 40.00 to 72.00 hours or fermenting in the first stage of fermentation the soybean and cereal grain blend agglomerate of step e.) for 40.00 to 72.00 hours, after which the koji is obtained which is fed to the second stage of fermentation.

* * * * *